(12) United States Patent
Kim et al.

(10) Patent No.: US 12,216,870 B2
(45) Date of Patent: Feb. 4, 2025

(54) FLEXIBLE TOUCH PANEL AND FLEXIBLE DISPLAY DEVICE

(71) Applicant: Samsung Display Co., Ltd., Yongin-si (KR)

(72) Inventors: Hyung Chul Kim, Anyang-si (KR); Jung Mok Park, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/379,031

(22) Filed: Oct. 11, 2023

(65) Prior Publication Data
US 2024/0045552 A1    Feb. 8, 2024

Related U.S. Application Data

(63) Continuation of application No. 18/111,858, filed on Feb. 20, 2023, now Pat. No. 11,807,487, which is a
(Continued)

(30) Foreign Application Priority Data

Jan. 9, 2015    (KR) .................. 10-2015-0003504

(51) Int. Cl.
*G06F 3/044*    (2006.01)
*B65H 5/02*    (2006.01)
(Continued)

(52) U.S. Cl.
CPC ........... *G06F 3/0443* (2019.05); *B65H 5/025* (2013.01); *G03G 15/6555* (2013.01);
(Continued)

(58) Field of Classification Search
CPC .... G06F 3/0443; G06F 3/0446; G06F 3/0412; G06F 3/04164; G06F 2203/04102; G06F 2203/04106; G06F 2203/04111; G06F 2203/04112; B65H 5/025; G03G 15/6555; G03G 2215/00679; G09G 3/3208
See application file for complete search history.

(56) References Cited

U.S. PATENT DOCUMENTS 7,948,151 B1    5/2011    Blackburn et al.
8,068,886 B2    11/2011    Vartanian
(Continued)

FOREIGN PATENT DOCUMENTS

CN    102467308    5/2012
CN    103984454    8/2014
(Continued)

OTHER PUBLICATIONS

European Search Report issued on Aug. 31, 2016, for European Patent Application No. 16150565.6.
(Continued)

*Primary Examiner* — Sejoon Ahn
(74) *Attorney, Agent, or Firm* — Lewis Roca Rothgerber Christie LLP (57) ABSTRACT

A flexible touch panel including a flexible substrate bent in a first direction, and a touch sensor unit disposed on the flexible substrate, the touch sensor unit including a bridge extending in a second direction intersecting the first direction.

10 Claims, 7 Drawing Sheets

Related U.S. Application Data continuation of application No. 17/827,784, filed on May 29, 2022, which is a continuation of application No. 17/358,686, filed on Jun. 25, 2021, now Pat. No. 11,347,358, which is a continuation of application No. 16/749,936, filed on Jan. 22, 2020, now Pat. No. 11,061,516, which is a continuation of application No. 15/939,612, filed on Mar. 29, 2018, now Pat. No. 10,585,526, which is a continuation of application No. 14/880,753, filed on Oct. 12, 2015, now Pat. No. 9,933,886.

(51) Int. Cl.
  *G03G 15/00* (2006.01)
  *G06F 3/041* (2006.01)
  *G09G 3/3208* (2016.01)

(52) U.S. Cl.
  CPC .......... *G06F 3/0412* (2013.01); *G06F 3/0446* (2019.05); *G09G 3/3208* (2013.01); *G03G 2215/00679* (2013.01); *G06F 3/04164* (2019.05); *G06F 2203/04102* (2013.01); *G06F 2203/04106* (2013.01); *G06F 2203/04111* (2013.01); *G06F 2203/04112* (2013.01)

(56) References Cited

U.S. PATENT DOCUMENTS

| | | |
|---|---|---|
| 8,199,033 B2 | 6/2012 | Peterson et al. |
| 8,730,191 B2 | 5/2014 | Kim et al. |
| 10,067,623 B2 | 9/2018 | Park et al. |
| 2005/0226617 A1 | 10/2005 | Lee et al. |
| 2006/0061531 A1 | 3/2006 | Park et al. |
| 2007/0248799 A1 | 10/2007 | DeAngelis et al. |
| 2008/0106505 A1 | 5/2008 | Chou |
| 2008/0303782 A1 | 12/2008 | Grant et al. |
| 2009/0153502 A1 | 6/2009 | Jiang et al. |
| 2009/0153516 A1 | 6/2009 | Liu et al. |
| 2009/0160799 A1 | 6/2009 | Jiang et al. |
| 2011/0134055 A1 | 6/2011 | Jung et al. |
| 2011/0227858 A1 | 9/2011 | An et al. |
| 2011/0304578 A1 | 12/2011 | Kim et al. |
| 2012/0075218 A1 | 3/2012 | Lin et al. |
| 2012/0075257 A1 | 3/2012 | Choi et al. |
| 2012/0098762 A1 | 4/2012 | Kim et al. |
| 2012/0127112 A1 | 5/2012 | Lu et al. |
| 2012/0169628 A1 | 7/2012 | Kuo et al. |
| 2012/0262385 A1 | 10/2012 | Kim et al. |
| 2012/0262409 A1 | 10/2012 | Tsai et al. |
| 2012/0271319 A1 | 10/2012 | Bromander et al. |
| 2013/0098664 A1 | 4/2013 | Juan et al. |
| 2013/0100053 A1 | 4/2013 | Kang et al. |
| 2013/0241855 A1 | 9/2013 | Kim |
| 2013/0278521 A1 | 10/2013 | Kim |
| 2013/0278542 A1 | 10/2013 | Stephanou et al. |
| 2013/0285938 A1 | 10/2013 | Kang et al. |
| 2014/0071065 A1 | 3/2014 | Kung et al. |
| 2014/0118292 A1 | 5/2014 | Kim |
| 2014/0118635 A1 | 5/2014 | Yang |
| 2014/0152588 A1 | 6/2014 | Kang et al. |
| 2014/0225864 A1 | 8/2014 | Chang et al. |
| 2014/0253830 A1 | 9/2014 | Li et al. |
| 2016/0054832 A1 | 2/2016 | Kim et al. |
| 2016/0178974 A1 | 6/2016 | Li et al. |
| 2016/0283025 A1 | 9/2016 | Yang et al. |
| 2017/0205738 A1* | 7/2017 | Hidaka ..................... B65H 5/06 |
| 2017/0205928 A1* | 7/2017 | Noguchi ................ H05K 1/147 |
| 2017/0206821 A1* | 7/2017 | Lee ..................... H01L 27/1274 |
| 2017/0206826 A1* | 7/2017 | Kong ........................ G09G 3/20 |
| 2019/0187838 A1 | 6/2019 | Sagawai et al. |
| 2019/0187841 A1 | 6/2019 | Kuwabara |
| 2020/0279542 A1* | 9/2020 | Minaki ..................... G09G 5/37 |
| 2020/0286417 A1* | 9/2020 | Chae ......................... G09G 3/20 |
| 2020/0302848 A1* | 9/2020 | Lin ............................ G09G 3/36 |
| 2021/0089265 A1 | 3/2021 | Van Erven et al. |
| 2021/0090495 A1 | 3/2021 | Chen |

FOREIGN PATENT DOCUMENTS

| | | |
|---|---|---|
| EP | 2521012 | 11/2012 |
| JP | 2012-094125 | 5/2012 |
| KR | 10-2012-0043406 | 5/2012 |
| KR | 10-2013-0072410 | 7/2013 |
| KR | 10-2013-0115692 | 10/2013 |
| KR | 10-2014-0018669 | 2/2014 |
| KR | 10-2014-0040432 | 4/2014 |
| KR | 10-2014-0062269 | 5/2014 |
| KR | 10-2014-0070106 | 6/2014 |
| KR | 10-1444132 | 11/2014 |

OTHER PUBLICATIONS

European Search Report issued on May 12, 2016, for European Patent Application No. 16150565.6.
Non-Final Office Action issued Jan. 12, 2017,in U.S. Appl. No. 14/880,753.
Final Office Action issued Jul. 20, 2017,in U.S. Appl. No. 14/880,753.
Notice of Allowance issued Nov. 20, 2017,in U.S. Appl. No. 14/880,753.
Corrected Notice of Allowability issued Jan. 24, 2018, in U.S. Appl. No. 14/880,753.
Non-Final Office Action issued Jun. 7, 2018,in U.S. Appl. No. 15/939,612.
Final Office Action issued Jan. 8, 2019,in U.S. Appl. No. 15/939,612.
Non-Final Office Action issued in May 1, 2019, in U.S. Appl. No. 15/939,612.
Notice of Allowance issued in Sep. 18, 2019,in U.S. Appl. No. 15/939,612.
Japanese Office Action dated Jan. 7, 2020,in Japanese Patent Application No. 2015-249760 (with English Translation).
Office Action dated Nov. 5, 2020, issued to European Patent Application No. 20167292.
Non-Final Office Action issued in Aug. 20, 2020, in U.S. Appl. No. 16/749,936.
Notice of Allowance issued in Mar. 17, 2021, in U.S. Appl. No. 16/749,936.
Notice of Allowance issued in Feb. 4, 2022,in U.S. Appl. No. 17/358,686.
Notice of Allowance issued in Oct. 21, 2022,in U.S. Appl. No. 17/827,794.
Request for the Submission of an Opinion dated Mar. 21, 2023, issued to Korean Patent Application No. 10-2022-0104871.
Notice of Allowance issued Sep. 26, 2023, in U.S. Appl. No. 18/111,858.
CN Office Action issued Nov. 10, 2023 in Chinese Patent Application No. 202010677291.3.

* cited by examiner

FLEXIBLE TOUCH PANEL AND FLEXIBLE DISPLAY DEVICE

CROSS-REFERENCE TO RELATED APPLICATIONS

This application is a Continuation of U.S. patent application Ser. No. 18/111,858, filed Feb. 20, 2023, which is a Continuation of U.S. patent application Ser. No. 17/827,794, filed on May 30, 2022, issued as U.S. Pat. No. 11,586,329, which is a Continuation of U.S. patent application Ser. No. 17/358,686, filed on Jun. 25, 2021, issued as U.S. Pat. No. 11,347,358, which is a Continuation of U.S. patent application Ser. No. 16/749,936, filed on Jan. 22, 2020, issued as U.S. Pat. No. 11,061,516, which is a Continuation of U.S. patent application Ser. No. 15/939,612, filed on Mar. 29, 2018, issued as U.S. Pat. No. 10,585,526, which is a Continuation of U.S. patent application Ser. No. 14/880,753, filed on Oct. 12, 2015, issued as U.S. Pat. No. 9,933,886, each of which claims priority from and the benefit of Korean Patent Application No. 10-2015-0003504, filed on Jan. 9, 2015, which are hereby incorporated by reference for all purposes as if fully set forth herein.

BACKGROUND

Field

Exemplary embodiments of the present invention relate to a flexible touch panel and a flexible display device.

Discussion of the Background

A touch panel may recognize a touch of a pen or a user's finger. The touch panel may be disposed on a display panel, such as an organic light emitting diode display or a liquid crystal display, to input a signal to a display device. The touch panel includes a substrate and a touch sensor unit disposed on the substrate to recognize a touch. The touch sensor unit includes sensing electrodes and bridges connecting the sensing electrodes.

Bridges of a touch sensor unit may be damaged from stress when a touch panel is bent. A flexible touch panel including a flexible substrate has been recently studied.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments of the present invention provide a flexible touch panel and a flexible display device that may suppress damage from stress to a bridge of a touch sensor unit.

Additional aspects will be set forth in the detailed description which follows, and, in part, will be apparent from the disclosure, or may be learned by practice of the inventive concept.

According to an exemplary embodiment of the present invention, a flexible touch panel includes a flexible substrate bent in a first direction, and a touch sensor unit disposed on the flexible substrate, the touch sensor unit including a bridge extending in a second direction intersecting the first direction.

The second direction may be perpendicular to the first direction.

The touch sensor unit may further include first sensing electrodes disposed on the flexible substrate, each of the first sensing electrodes separated from each other along a third direction, a connection part connecting the first sensing electrodes, second sensing electrodes disposed on the flexible substrate, each of the second sensing electrodes separated from each other along a fourth direction intersecting the first direction, and an insulating pattern disposed between the connection part and the bridge, the insulating pattern covering the connection part, and the bridge may be disposed on the connection part and connects the second sensing electrodes.

The first sensing electrode and the connection part may be integrally formed.

The second sensing electrode may be disposed on the same layer as the first sensing electrode.

The bridge may include a metal.

The second sensing electrode may include a transparent conductive material.

The insulating pattern may include a bent surface and the bridge may be bent along the bent surface.

The flexible touch panel may include at least two bridges connecting adjacent second sensing electrodes.

The second direction and the fourth direction may intersect each other at an angle in the range of 5° to 80°.

The third direction may be parallel to the first direction.

The flexible touch panel may further include a window disposed on the touch sensor unit, the window may be bent in the first direction.

According to an exemplary embodiment of the present invention, a flexible display device includes a flexible display panel bent in a first direction and configured to display an image, and a touch sensor unit disposed on the flexible display panel and including a bridge extending in a second direction intersecting the first direction.

The flexible display device may further include a window disposed on the touch sensor unit, the window may be bent in the first direction.

According to an exemplary embodiment of the present invention, a flexible touch panel includes a flexible substrate, and a touch sensor unit formed on the flexible substrate, the touch sensor unit including a bridge extending in a direction intersecting a direction in which the flexible substrate is bent.

According to an exemplary embodiment of the present invention, a flexible display device includes a flexible display panel displaying an image, and a touch sensor unit formed on the flexible display panel, the touch sensor unit including a bridge extending in a direction intersecting a direction in which the flexible display panel is bent.

According to exemplary embodiments of the present invention, a flexible touch panel and a flexible display device may suppress damage from stress to a bridge of a touch sensor unit.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept.

DETAILED DESCRIPTION OF THE ILLUSTRATED EMBODIMENTS

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, region s, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 1:
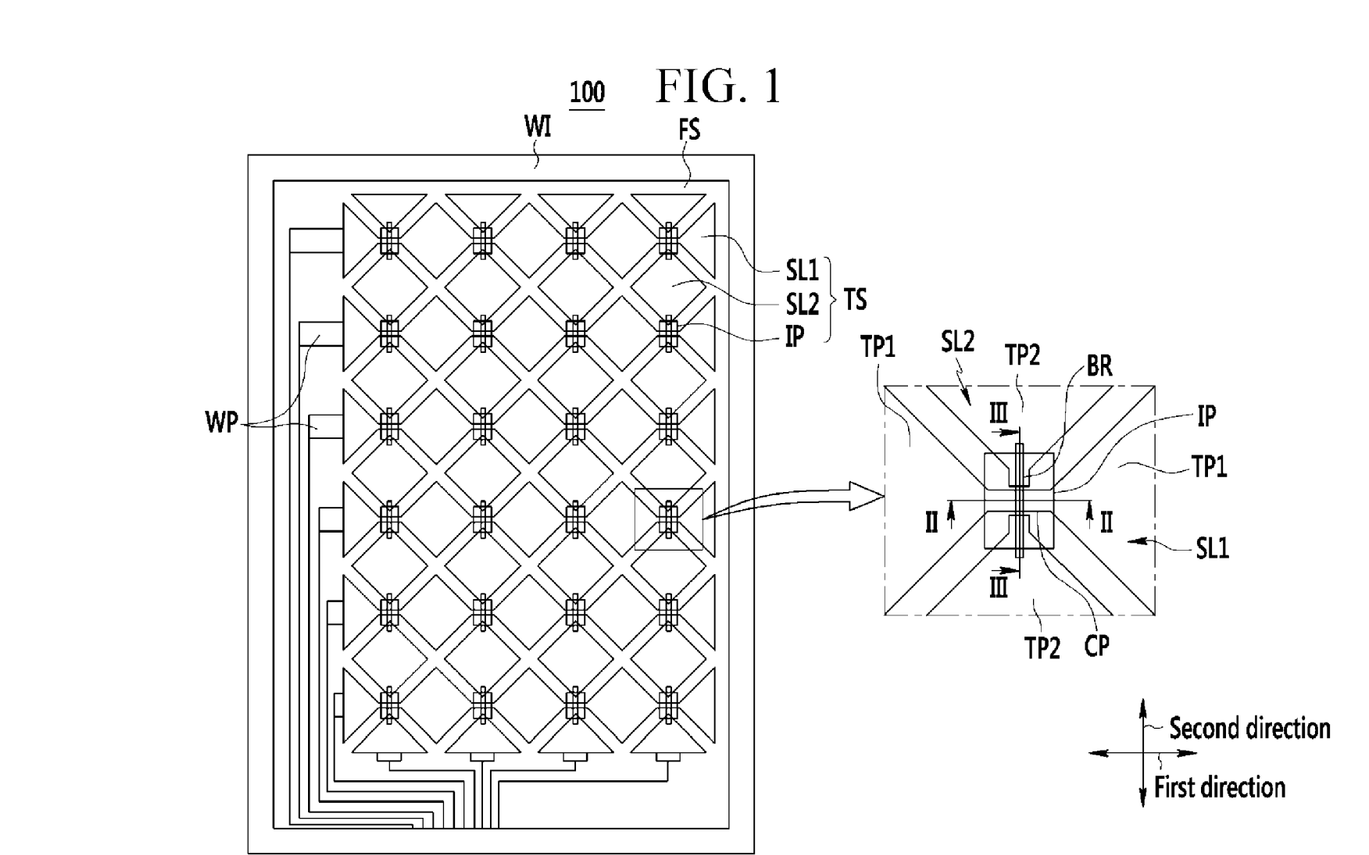
FIG. 1 is a plan view of a flexible touch panel according to an exemplary embodiment of the present invention.
Figure 2:
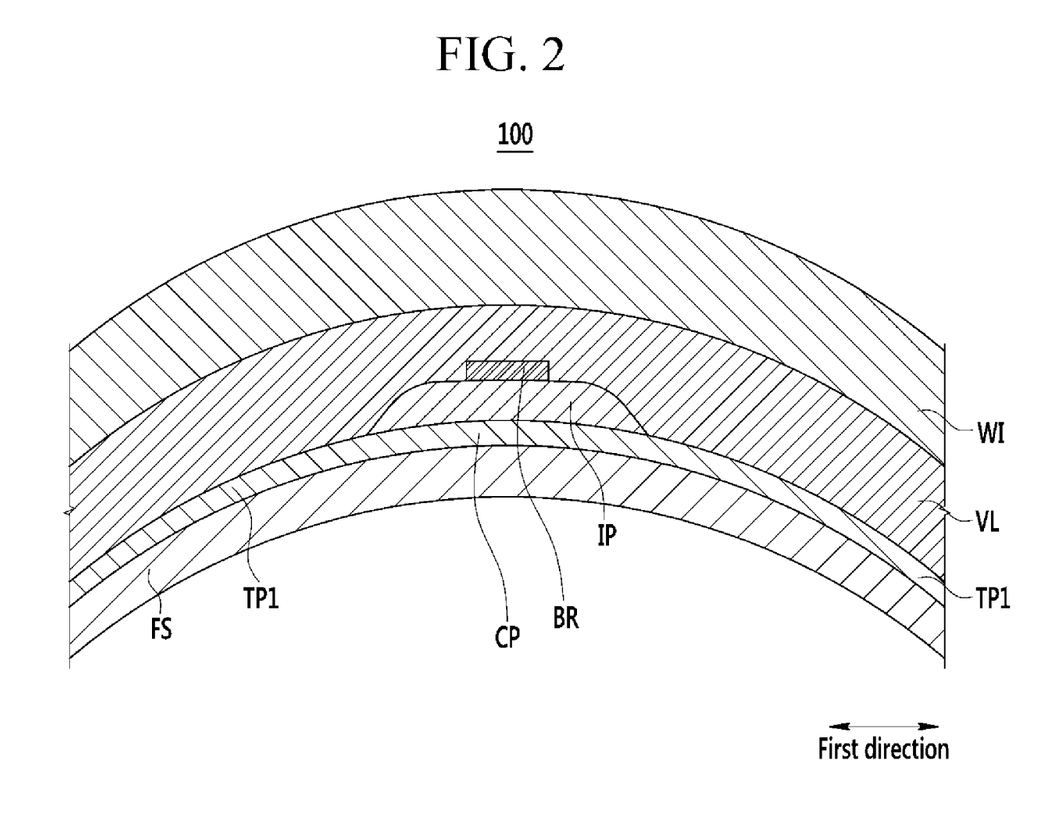
FIG. 2 is a cross-sectional view of FIG. 1 taken along line II-II.
Figure 3A:
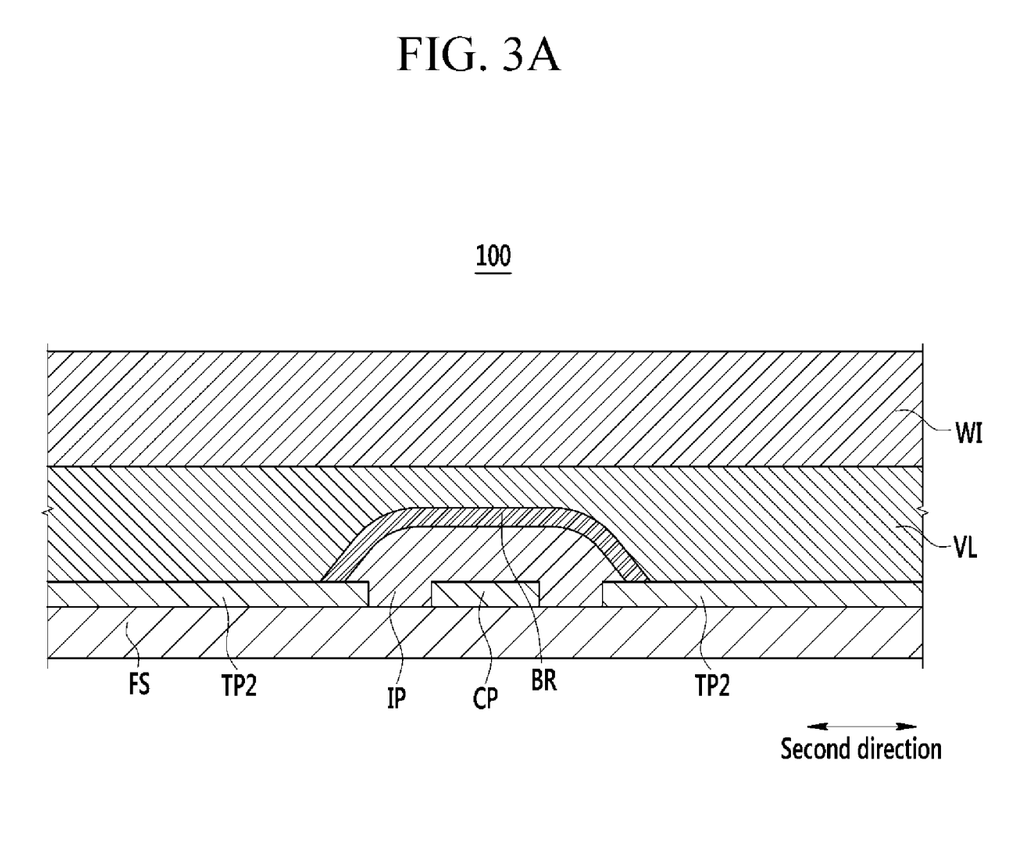
FIG. 3A is a cross-sectional view of FIG. 1 taken along line III-III.

FIG. 1 is a plan view of a flexible touch panel according to an exemplary embodiment of the present invention. FIG. 2 is a cross-sectional view of FIG. 1 taken along line II-II. FIG. 3A is a cross-sectional view of FIG. 1 taken along line III-III.

Referring to FIGS. 1 to 3A, a flexible touch panel 100 according to the present exemplary embodiment recognizes a touch and includes a flexible substrate FS, a wiring part WP, a touch sensor unit TS, and a window WI.

The flexible substrate FS may include a flexible film. The flexible substrate FS is an insulating substrate including polymer, glass, stainless steel, or the like. The flexible substrate FS may be flexible, stretchable, foldable, bendable, or rollable, such that the flexible touch panel 100 may be flexible, stretchable, foldable, bendable, or rollable. The flexible substrate FS may be bent in one direction and the flexible substrate FS of the present exemplary embodiment may be bent in a first direction.

The flexible touch panel 100 may include a touch controller (not illustrated) formed as a flexible printed circuit board, a printed circuit board, or the like, and may be connected to the wiring part (WP). The touch controller (not illustrated) digitizes an electrical analog signal transmitted from the flexible touch panel 100 into a digital signal using a converter, and the like to calculate touched location information.

According to the present exemplary embodiment, the first direction is the direction in which the flexible substrate FS is bent. According to an exemplary embodiment of the present invention, the first direction may be parallel with a direction in which the flexible substrate FS is bent.

The wiring part WP is disposed in an area outside of the flexible substrate FS and is connected to the touch sensor unit TS. The wiring part WP may connect the touch sensor unit TS to the touch controller, and include opaque conductive materials such as metal, or transparent conductive materials. The wiring part WP may be formed on the flexible substrate FS using a different process from or the same process as the touch sensor unit TS.

The touch sensor unit (TS) may recognize a touch and be transparent. The touch sensor unit TS is disposed on the flexible substrate FS and may operate in a capacitive type. The touch sensor unit TS includes a first signal line SL1 extending in the first direction on the flexible substrate FS to be connected to the wiring part WP, a second signal line SL2 extending in a second direction intersecting the first direction to be connected to the wiring part WP, and an insulating pattern IP disposed between the first signal line SL1 and the second signal line SL2, corresponding to a portion where the first signal line SL1 and the second signal line SL2 intersect each other.

There may be multiple first signal lines SL1 and each of the first signal lines SL1 may sequentially be disposed in the second direction. There may be multiple second signal lines SL2 and each of the second signal lines SL2 may sequentially be disposed in the first direction. The first signal line SL1 and the second signal line SL2 intersect each other and an insulating pattern IP is disposed between the first signal line SL1 and the second signal line SL2, so that the first signal line SL1 and the second signal line SL2 intersect each other while being insulated from each other, at a portion where the first signal line SL1 and the second signal line SL2 intersect each other.

In the flexible touch panel 100, when a voltage is sequentially applied to the first signal lines SL1 and the second signal lines SL2, charge is filled in the first signal lines SL1 and the second signal lines SL2, respectively. When the first signal line SL1 or the second signal line SL2 is touched, a capacitance of the touched first signal line SL1 or second signal line SL2 is changed, such that the flexible touch panel 100 determines a touched position.

Hereinafter, the first signal line SL1, the second signal line SL2, and the insulating pattern IP will each be described in detail.

The first signal line SL1 includes a first sensing electrode TP1 and a connection part CP. Multiple first sensing electrodes TP1 may be formed and each of the first sensing electrodes TP1 are disposed to be separated from each other in the first direction, which is a direction the flexible substrate FS is bent. The connection part CP connects the first sensing electrodes TP1, and more particularly, connects adjacent first sensing electrodes TP1 to each other. The first sensing electrode TP1 and the connection part CP are integrally formed. The first sensing electrode TP1 and the connection part CP may include a transparent conductive material, including at least one of indium tin oxide (ITO), indium zinc oxide (IZO), metal mesh, conductive polymer, and silver nanowire (AgNW). The metal mesh may be a metal pattern layer having a mesh form that includes openings. When the metal mesh has the mesh form, the metal mesh may include openings in any form. For example, openings may have triangular shape, rectangular shape, pentagonal shape, hexagonal shape, heptagon shape, polygonal shape, circular shape, oval shape, or closed loop shape. Further, the silver nanowire may be in a form of dispersed silver nanowire in a base layer including resin, or may be in any form if the transparent conductive material includes the silver nanowire.

The second signal line SL2 includes a second sensing electrode TP2 and a bridge BR. Multiple second sensing electrodes TP2 may be formed and each of the second sensing electrodes TP2 are disposed to be separated from each other in a second direction intersecting the first direction. The bridge BR connects the second sensing electrodes TP2, and more particularly, connects between adjacent second sensing electrodes TP2. The second sensing electrode TP2 and the bridge BR are formed on different layers. The bridge BR connects between the adjacent second sensing electrodes TP2 in a bridge form. More particularly, the bridge BR connects the adjacent second sensing electrodes TP2, while being separated from the connection part CP by the insulating pattern IP.

The second sensing electrode TP2 may include the same material and formed on the same layer as the first sensing electrode TP1 and the connection part CP. The second sensing electrode TP2 may be simultaneously formed with the first sensing electrode TP1 and the connection part CP. The second sensing electrode TP2 may include a transparent conductive material, including at least one of indium tin oxide (ITO), indium zinc oxide (IZO), metal mesh, conductive polymer, carbon nanotube (CNT), and silver nanowire (AgNW).

The bridge BP is separated from the connection part CP by the insulating pattern IP disposed therebetween. More particularly, the bridge BP is disposed on the connection part CP, and the insulating pattern IP is disposed therebetween. The bridge BR may include a material different from the second sensing electrode TP2, and may include metals, for example, gold, silver, and copper, etc., having low electrical resistance.

According to an exemplary embodiment of the present invention, the bridge may include at least one of indium tin oxide (ITO), indium zinc oxide (IZO), metal mesh, conductive polymer, carbon nanotube (CNT), silver nanowire (AgNW), and the like.

The bridge BR extends in the second direction intersecting the first direction in which the flexible substrate FS is bent, to connect the adjacent second sensing electrodes TP2. The extending direction of the bridge BR is vertical to the first direction. Alternatively, the bridge BR may extend in any direction intersecting a direction in which the flexible substrate FS is bent. The bridge BR is disposed on the insulating pattern IP having a bent surface, such that the bridge BR is bent in the second direction along the bent surface of the insulating pattern IP. As the bridge BR is bent in the second direction along the bent surface of the insulating pattern IP, residual stress may exist at several bent portions of the bridge BR. Accordingly, when a stress occurs in the second direction, the bridge may be damaged due to the stress. However, since the flexible substrate FS according to the present exemplary embodiment is configured to be bent in the first direction, and the bridge BR extends in the second direction intersecting the first direction, the stress is applied to the bridge in the first direction, when the flexible substrate FS is bent. Accordingly, damage to the bridge BR from the stress may be suppressed.

Further, as the bridge BR extends in the second direction intersecting the first direction, when stress is applied to the bridge BR in the first direction due to bending the flexible substrate FS, the stress is applied to a lateral direction of the bridge BR, which has a large aspect ratio in the first direction. Accordingly, damage to the bridge BR may be also suppressed from the stress applied in the first direction.

The insulating pattern IP is disposed between the connection part CP and the bridge BR, and the insulating pattern IP has an island-shaped pattern. The insulating pattern IP covers the connection part CP. The insulating pattern IP has the bent surface and the bridge BR is disposed on the bent surface, such that the bridge BR extends along the bent surface of the insulating pattern IP, to be bent along the bent surface of the insulating pattern IP. The insulating pattern IP may include at least any one of silicon nitride (SiNx), aluminum oxide ($Al_2O_3$), silicon dioxide ($SiO_2$), titanium oxide ($TiO_2$), and the like, or may include polymer.

Figure 3B:
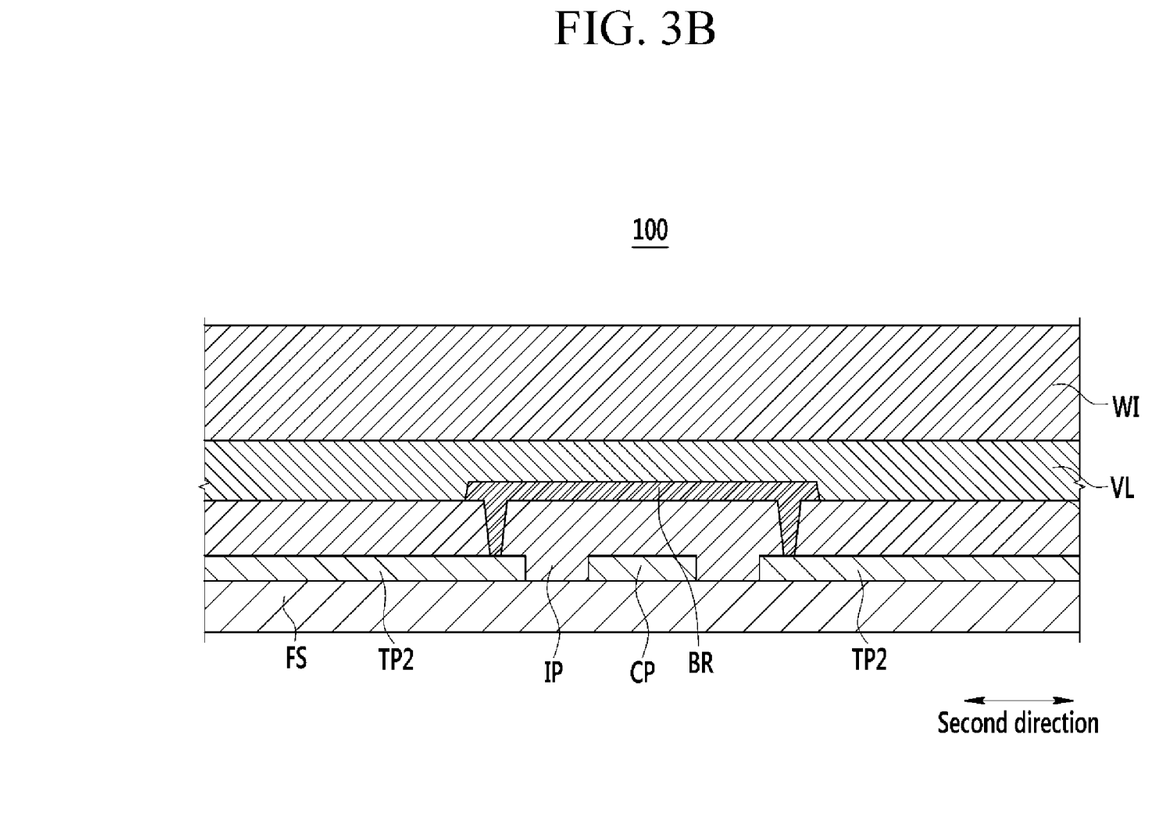
FIG. 3B is a cross-sectional view of a flexible touch panel according to an exemplary embodiment of the present invention.

FIG. 3B is a cross-sectional view of a flexible touch panel according to an exemplary embodiment of the present invention.

Referring to FIG. 3B, according to an exemplary embodiment of the present invention, the insulating pattern IP may be formed in a single plate-shaped insulating layer. In this manner, the bridge BR may connect the adjacent second sensing electrodes TP2 through contact hole of the insulating pattern IP.

The window WI is disposed on the touch sensor unit TS. The window WI may be attached to the touch sensor unit TS by an adhesive layer VL including a viscoelastic material. The window WI is disposed on the touch sensor unit TS to protect the touch sensor unit TS from outside interference. The window WI may have an area larger than that of the flexible substrate FS on which the touch sensor unit TS and the wiring part WP are formed. The window WI is disposed on the touch sensor unit TS and is bent in the same direction as the direction the flexible substrate FS is bent. The window WI may remain bent state in the first direction, which is the same direction as the flexible substrate FS is bent, such that the flexible substrate FS may also remain bent in the first direction. The window WI may include a transparent material and may include at least one of polymer, glass, quartz, and sapphire, and the like.

As such, in the flexible touch panel 100 according to the present exemplary embodiment, the bridge BR extends in the second direction intersecting the first direction of which the flexible substrate FS is bent, and thus the flexible substrate FS is bent in the first direction. Accordingly, even though stress is applied to the bridge BR in the first direction, the stress is applied to a lateral direction of the bridge BR that has a large aspect ratio in the first direction. Therefore damage to the bridge BR due to the stress applied in the first direction may be suppressed.

Further, in the flexible touch panel 100 according to the present exemplary embodiment, the bridge BR extends while being bent in the second direction along the bent surface of the insulating pattern IP. Accordingly, even though residual stress may exists at several bent portions of the bridge BR, since the flexible substrate FS is bent in the first direction, the stress is applied to the bridge BR in the first direction, such that damage to the bridge BR due to the stress may be suppressed. More particularly, the flexible touch panel 100 according to the present exemplary embodiment may suppress damage from stress to the bridge BR of the touch sensor unit TS.

Hereinafter, a flexible touch panel according to an exemplary embodiment of the present invention will be described with reference to FIG. 4. Components different from those of the flexible touch panel illustrated with reference to FIGS. 1 to 3B will be described.

Figure 4:
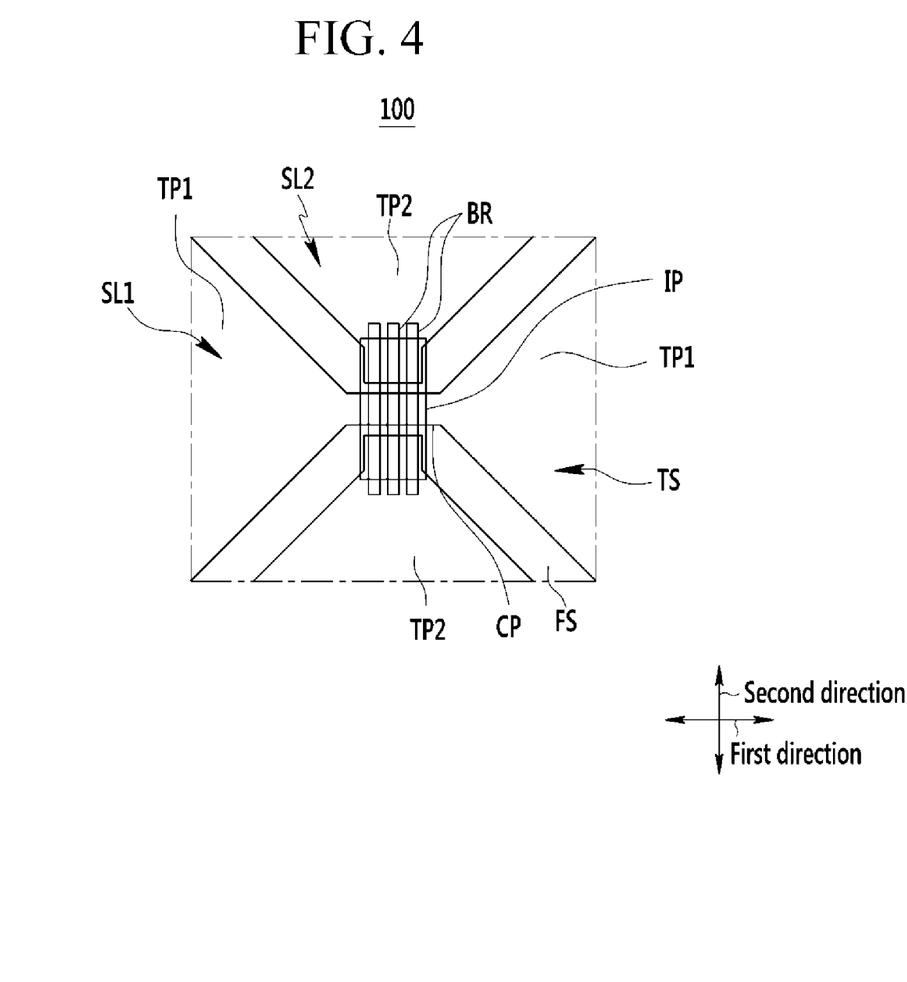
FIG. 4 is a plan view illustrating a portion of a flexible touch panel according to an exemplary embodiment of the present invention.

FIG. 4 is a plan view illustrating a portion of a flexible touch panel according to an exemplary embodiment of the present invention.

Referring to FIG. 4, the flexible touch panel 100 according to the present exemplary embodiment may include multiple bridges BR, and the bridges BRs extend in the second direction to connect adjacent second sensing electrodes TP2.

As such, in the flexible touch panel 100 according to the present exemplary embodiment, the bridges BRs extend in the second direction intersecting a first direction in which the flexible substrate FS is bent, and thus the flexible substrate FS is bent in the first direction. As a result, when stress is applied to the bridges BRs in the first direction, the stress is applied to a lateral direction of each of the bridges BR having a large aspect ratio in the first direction, and therefore damage to the bridges BR from the stress applied in the first direction may be suppressed.

Further, in the flexible touch panel 100 according to present exemplary embodiment, multiple bridges BR may be formed. As a result, when any one of the bridges BR is damaged due to the stress applied in the first direction, the remaining bridges BRs may suppress disconnection of adjacent second sensing electrodes TP2 from damage of the bridge BR. More particularly, the flexible touch panel 100 according to the present exemplary embodiment may suppress damage from stress to the bridge BR of the touch sensor unit TS.

Hereinafter, a flexible touch panel according to an exemplary embodiment of the present invention will be described with reference to FIG. 5. Components different from those of the flexible touch panel illustrated with reference to FIGS. 1 to 3B will be described.

Figure 5:
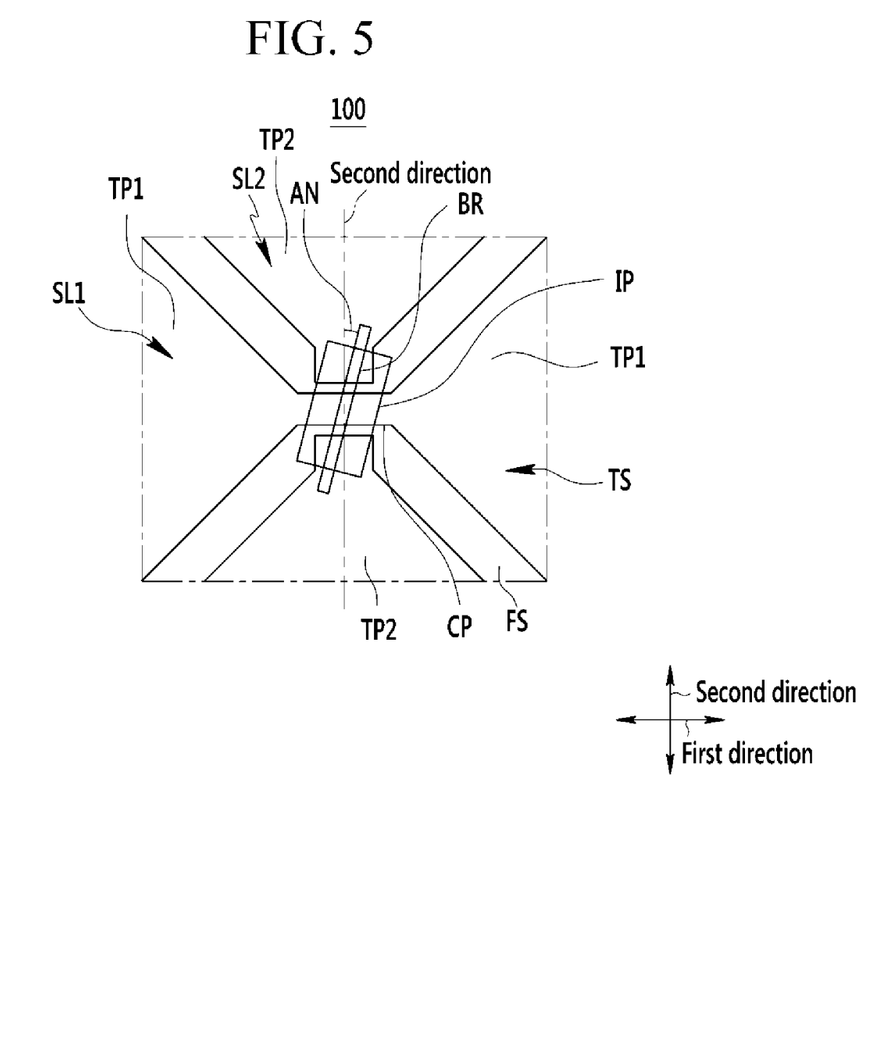
FIG. 5 is a plan view illustrating a portion of a flexible touch panel according to an exemplary embodiment of the present invention.

FIG. 5 is a plan view illustrating a portion of a flexible touch panel according to an exemplary embodiment of the present invention.

Referring to FIG. 5, the extending direction of the bridge BR of the flexible touch panel 100 according to the present exemplary embodiment is tilted at a predetermined angle with respect to the second direction. The extending direction of the bridge BR forms an angle of intersection AN in the range of 5° to 80° to the second direction. The extending direction of the insulating pattern IP of the flexible touch panel 100 according to the present exemplary embodiment is tilted at a predetermined angle with respect to the second direction. The extending direction of the insulating pattern IP forms an angle of intersection AN in the range of 5° to 80° to the second direction.

As such, in the flexible touch panel 100 according to the present exemplary embodiment, the bridge BR extends in the second direction intersecting the first direction of which the flexible substrate FS is bent, and thus the flexible substrate FS is bent in the first direction. As a result, when stress is applied to the bridges BRs in the first direction, the stress is applied to a lateral direction of each of the bridges BR having a large aspect ratio in the first direction, and therefore damage to the bridges BR from the stress applied in the first direction may be suppressed.

Further, in the flexible touch panel 100 according to the present exemplary embodiment, the bridge BR is tilted at a predetermined angle with respect to the second direction, and therefore light is suppressed from being reflected from a front surface of the bridge BR, such that the bridge BR may not be viewed from outside. More particularly, the flexible touch panel 100 may suppress damage from stress to the bridge BR of the touch sensor unit TS.

Hereinafter, a flexible display device according to an exemplary embodiment of the present invention will be described with reference to FIG. 6. Components different from those of the flexible touch panel illustrated with reference to FIGS. 1 to 3B will be described.

Figure 6:
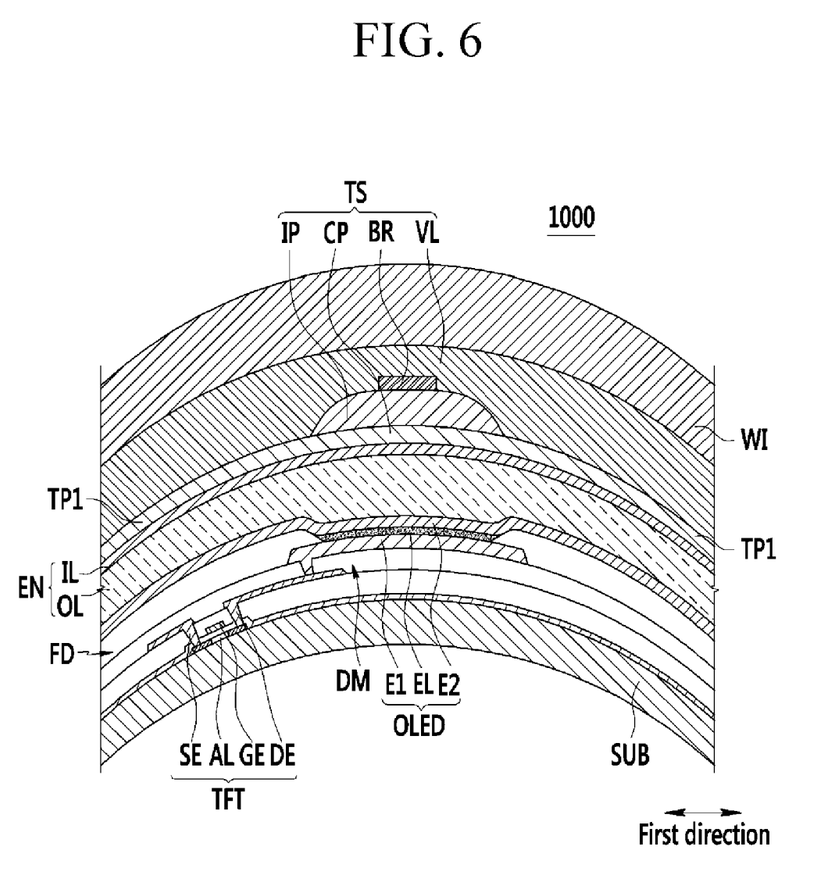
FIG. 6 is a cross-sectional view illustrating a portion of a flexible display device according to an exemplary embodiment of the present invention.

FIG. 6 is a cross-sectional view illustrating a portion of a flexible display device according to an exemplary embodiment of the present invention.

Referring to FIG. 6, a flexible display device 1000 according to the present exemplary embodiment includes a flexible display panel FD displaying an image, the touch sensor unit TS, and the window WI.

The flexible display panel FD is bent in the first direction and includes a substrate SUB, a display unit DM, and an encapsulation EN.

The substrate SUB is an insulating substrate including glass, polymer, stainless steel, or the like. The substrate SUB may be flexible, stretchable, foldable, bendable, or rollable such that the flexible display panel FD may be flexible, stretchable, foldable, bendable, or rollable. The substrate SUB may include a flexible film including a resin such as polyimide, or the like.

The display unit DM displays an image using pixels. The pixel may be a minimum unit displaying the image. The display unit DM includes an organic light emitting diode OLED emitting light and a thin-film transistor TFT connected to the organic light emitting diode OLED. According to an exemplary embodiment of the present invention the display unit DM may further include at least one scan wiring, at least one data wiring, thin-film transistors TFTs, and at least one capacitor, which may have various known structures.

The thin-film transistor TFT includes an active layer AL, a gate electrode GE, a source electrode SE, and a drain electrode DE.

The active layer AL may include polysilicon or an oxide semiconductor. The oxide semiconductor may include one of an oxide of titanium (Ti), hafnium (Hf), zirconium (Zr), aluminum (Al), tantalum (Ta), germanium (Ge), zinc (Zn), gallium (Ga), tin (Sn), and indium (In), or a composite oxides thereof, such as a zinc oxide (ZnO), an indium-gallium-zinc oxide (InGaZnO$_4$), an indium-zinc oxide (Zn—In—O), a zinc-tin oxide (Zn—Sn—O), an indium-gallium oxide (In—Ga—O), an indium-tin oxide (In—Sn—O), an indium-zirconium oxide (In—Zr—O), an indium-zirconium-zinc oxide (In—Zr—Zn—O), an indium-zirconium-tin oxide (In—Zr—Sn—O), an indium-zirconium-gallium oxide (In—Zr—Ga—O), an indium-aluminum oxide (In—Al—O), an indium-zinc-aluminum oxide (In—Zn—Al—O), an indium-tin-aluminum oxide (In—Sn—Al—O), an indium-aluminum-gallium oxide (In—Al—Ga—O), an indium-tantalum oxide (In—Ta—O), an indium-tantalum-zinc oxide (In—Ta—Zn—O), an indium-tantalum-tin oxide (In—Ta—Sn—O), an indium-tantalum-gallium oxide (In—Ta—Ga—O), an indium-germanium oxide (In—Ge—O), an indium-germanium-zinc oxide (In—Ge—Zn—O), an indium-germanium-tin oxide (In—Ge—Sn—O), an indium-germanium-gallium oxide (In—Ge—Ga—O), a titanium-indium-zinc oxide (Ti—In—Zn—O), and a hafnium-indium-zinc oxide (Hf—In—Zn—O).

The active layer AL includes a channel region not doped with impurities, and a source region and a drain region, which are formed by doping both sides of the channel region with impurities. The impurities may vary depending on a type of the thin-film transistor and N-type or P-type impurities. When the active layer AL is formed of the oxide semiconductor, a separate protecting layer may be disposed to protect the oxide semiconductor from external environment such as exposure to a high temperature, or the like.

The gate electrode GE is disposed on the active layer AL with an insulating layer interposed therebetween. The source electrode SE and the drain electrode DE are disposed on other insulating layers covering the gate electrode GE, and are connected to the source region and the drain region of the active layer AL through contact holes, respectively. The drain electrode DE is connected to a first electrode E1 of the organic light emitting diode OLED through a contact hole.

The organic light emitting diode OLED includes the first electrode E1 connected to the drain electrode DE of the thin film transistor TFT, an organic emission layer EL disposed on the first electrode E1, and a second electrode E2 disposed on the organic emission layer EL.

The first electrode E1 may be an anode, which is a hole injection electrode, and may be one of a light reflective electrode, a light transflective electrode, and a light transmitting electrode. Alternatively, the first electrode E1 may be a cathode, which is an electron injection electrode.

The organic emission layer EL is disposed on the first electrode E1. The organic emission layer EL may include a low molecular organic material or a high molecular organic material such as poly 3,4-ethylenedioxythiophene (PEDOT), or the like. The organic emission layer EL may include a red organic emission layer emitting red light, a green organic emission layer emitting green light, and a blue organic emission layer emitting blue light, whereby the red organic emission layer, the green organic emission layer, and the blue organic emission layer are formed in a red pixel, a green pixel, and a blue pixel, respectively, to implement a color image. The red organic emission layer, the green organic emission layer, and the blue organic emission layer are stacked together as the organic emission layer EL in all of the red pixel, the green pixel, and the blue pixel, and a red color filter, a green color filter, and a blue color filter are formed in each pixel, thereby implementing the color image. According to an exemplary embodiment of the present invention, a white organic emission layer emitting white light is formed as the organic emission layer EL in all of the red pixel, the green pixel, and the blue pixel, and a red color filter, a green color filter, and a blue color filter are formed in each pixel, thereby implementing the color image. When the white organic emission layer is used as the organic emission layer EL to implement the color image and the color filter, deposition masks for depositing the red organic emission layer, the green organic emission layer, and the blue organic emission layer on the respective pixels, that is, the red pixel, the green pixel, and the blue pixel may not be used. The white organic emission layer may include one organic emission layer or organic emission layers are stacked to emit white light. For example, the organic emission layer EL may include at least one yellow organic emission layer and at least one blue organic emission layer combined with each other to emit white light, at least one cyan organic emission layer and at least one red organic emission layer combined with each other to emit white light, at least one magenta organic emission layer and at least one green organic emission layer combined with each other to emit white light to be emitted, and the like.

The second electrode E2 may be disposed on the organic emission layer EL and may be a cathode, which is an electron injection electrode. The second electrode E2 may be one of a light reflective electrode, a light transflective electrode, and a light transmitting electrode. The second electrode E2 is disposed positioned over the entire display area DA of the substrate SUB so as to cover the organic emission layer EL. Alternatively, the second electrode E2 may be an anode, which is a hole injection electrode.

The encapsulation EN is disposed above the substrate SUB, having the display unit DM interposed therebetween. The encapsulation EN is disposed above the substrate SUB over the entire display area DA and the non-display area NDA of the substrate SUB and encapsulates the display unit DM together with the substrate SUB. The encapsulation EN may be formed as a thin film encapsulation. The encapsulation EN includes an organic layer OL disposed over the display unit DM and an inorganic layer IL disposed on the organic layer OL. According to an exemplary embodiment of the present invention, the encapsulation EN may include at least one organic layer and at least one inorganic layer that are alternately stacked. More particularly, multiple inorganic layers or organic layers may be formed, and the inorganic layers and the organic layers may be alternately stacked. For example, the encapsulation EN may include at least one sandwich structure in which at least one organic layer is inserted between at least two inorganic layers.

The organic layer OL may be formed of polymer, and be a single film or a stacked film formed of one of polyethylene terephthalate, polyimide, polycarbonate, epoxy, polyethylene, and polyacrylate. For example, the organic layer may be formed of polyacrylate. In detail, the organic layer may include a polymerized monomer composition including a diacrylate based monomer and a triacrylate based monomer. Here, the monomer composition may further include a monoacrylate based monomer, and may further include a known photo initiator such as 2,4,6-trimethylbenzoyl-diphenyl-phosphineoxide (TPO).

The inorganic layer IL may be a single film or a stacked film including a metal oxide or a metal nitride. In detail, the inorganic layer may include any one or more of silicon nitride (SiNx), aluminum oxide ($Al_2O_3$), silicon dioxide ($SiO_2$), and titanium dioxide ($TiO_2$).

According to an exemplary embodiment of the present invention, a flexible display panel FD may include display devices, such as liquid crystal displays (LCDs), plasma displays (PDs), field emission displays (FEDs), electrophoretic displays, (EPDs), electrowetting displays, (EWDs), and the like, as long as display panels are flexible.

The touch sensor unit TS is formed on the encapsulation EN of the flexible display panel FD. The touch sensor unit TS includes the first sensing electrode TP1, the connection part CP, the second sensing electrode, and the bridge BR as described in exemplary embodiments of the present invention.

The first sensing electrode TP1, the connection part CP, and the second sensing electrode are each formed on the encapsulation EN.

The bridge BR extends in a first direction, which intersects a direction in which the flexible display panel is bent, to connect adjacent second sensing electrodes. The bridge BR extends in the second direction vertical to the first direction or alternatively, in any direction, if intersecting the direction in which the flexible display panel FD is bent.

The window WI is disposed on the touch sensor unit TS. The window WI may be attached to the touch sensor unit TS by an adhesive layer VL including a viscoelastic material and is disposed on the touch sensor unit TS to protect the touch sensor unit TS and the flexible display panel FD from outside interference. The window WI may have an area larger than that of the flexible display panel FD. The window WI is disposed on the touch sensor unit TS and is bent in the same direction as the direction in which the flexible display panel FD is bent. The window WI may keep a bent state in the first direction which is the same direction as a direction in which the flexible display panel FD is bent, such that the flexible display panel FD may also keep a bent state in the first direction. The window WI may include a transparent material such as polymer, glass, quartz, and sapphire, and the like.

In the flexible display device 1000 according to the present exemplary embodiment, the bridge BR extends in the second direction intersecting the first direction in which the flexible display panel FD is bent, and thus the flexible display panel FD is bent in the first direction. As a result, even though stress is applied to the bridge BR in the first direction, the stress is applied to a lateral direction of the bridge BR having a large aspect ratio in the first, and therefore damage to the bridge BR due to the stress applied in the first direction may be suppressed. More particularly, the flexible display panel FD may suppress damage from stress to the bridge BR of the touch sensor unit TS.

Although certain exemplary embodiments and implementations have been described herein, other embodiments and modifications will be apparent from this description. Accordingly, the inventive concept is not limited to such exemplary embodiments, but rather to the broader scope of the presented claims and various obvious modifications and equivalent arrangements.

What is claimed is:
1. A touch panel, comprising:
a substrate; and
a sensing pattern disposed on the substrate,
wherein:
  the sensing pattern comprises:
    a first sensing electrode arranged in a first direction;
    a second sensing electrodes separated from each other arranged in a second direction crossing the first direction; and
    a connection pattern connecting two adjacent second sensing electrodes;
  the first sensing electrode and the second sensing electrode are disposed on a same layer;
  the touch panel further comprises an insulation layer disposed between the connection pattern and the first sensing electrode;
  the connection pattern comprises a first connection pattern and a second connection pattern;
  the first connection pattern is disposed at a different layer from the sensing pattern;
  the first connection pattern is connected the second sensing electrode;
  the second connection pattern and the sensing pattern are disposed on a same layer; and
  the first connection pattern is connected the second connection pattern.

2. The touch panel of claim 1, wherein in a unit area, a ratio of a number of the first connection patterns to a number of the second connection patterns is 2:1.

3. The touch panel of claim 1, wherein the sensing pattern forms a mesh pattern.

4. The touch panel of claim 1, wherein the first sensing electrode, the second sensing electrodes, and the connection pattern comprise a metal.

5. The touch panel of claim 1, wherein adjacent ones of the second sensing electrodes are electrically connected through at least one connection pattern.

6. The touch panel of claim 1, wherein the connection pattern crosses the first sensing electrode.

7. The touch panel of claim 6, wherein the connection pattern obliquely crosses the first sensing electrode.

8. The touch panel of claim 6, wherein the connection pattern is not parallel to an edge of the first sensing electrode.

9. The touch panel of claim 1, wherein the second sensing electrodes comprise a same material as the first sensing electrode and are disposed at a same layer as the first sensing electrode.

10. The touch panel of claim 9, wherein the second sensing electrodes comprise a transparent conductive material.

* * * * *